(12) United States Patent
Zarei et al.

(10) Patent No.: US 10,460,865 B2
(45) Date of Patent: Oct. 29, 2019

(54) INDUCTOR ASSEMBLY

(71) Applicant: FORD GLOBAL TECHNOLOGIES, LLC, Dearborn, MI (US)

(72) Inventors: Shahram Zarei, Farmington Hills, MI (US); Behzad Vafakhah, Ann Arbor, MI (US); Jeremy Richard Ikerd, Eastpointe, MI (US); Vincent Skalski, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 13/673,740

(22) Filed: Nov. 9, 2012

(65) Prior Publication Data

US 2014/0132382 A1 May 15, 2014

(51) Int. Cl.

| | | |
|---|---|---|
| *H01F 27/12* | (2006.01) | |
| *H01F 37/00* | (2006.01) | |
| *F16H 57/04* | (2010.01) | |
| *B60K 6/40* | (2007.10) | |
| *B60K 6/445* | (2007.10) | |
| *H01F 3/14* | (2006.01) | |
| *H01F 27/30* | (2006.01) | |

(Continued)

(52) U.S. Cl.
CPC ............... *H01F 27/12* (2013.01); *B60K 6/40* (2013.01); *B60K 6/445* (2013.01); *F16H 57/0417* (2013.01); *F16H 57/0476* (2013.01); *H01F 37/00* (2013.01); *B60K 2001/003* (2013.01); *B60K 2001/006* (2013.01); *H01F 3/14* (2013.01); *H01F 27/306* (2013.01); *H01F 27/324* (2013.01); *Y02T 10/6239* (2013.01)

(58) Field of Classification Search
CPC .................................. H01F 27/12; H01F 37/00
USPC .................................... 336/83, 90, 92, 94, 96
See application file for complete search history.

(56) References Cited

U.S. PATENT DOCUMENTS 1,360,752 A * 11/1920 Johannesen ............. H01F 30/10
                                                          29/602.1
1,579,049 A    3/1926 Ainsworth
(Continued)

FOREIGN PATENT DOCUMENTS

| CA | 1210464 A | 8/1986 |
|---|---|---|
| CA | 2781203 | 5/2011 |

(Continued)

OTHER PUBLICATIONS

Salem et al., "Power Module Cooling for Future Electric Vehicle Applications: A Coolant Comparison of Oil and PGW," US Naval Academy, Annapolis, MD (2006) pp. 1-4.

(Continued)

*Primary Examiner* — Tszfung J Chan
(74) *Attorney, Agent, or Firm* — David Kelley; Brooks Kushman P.C.

(57) ABSTRACT

A vehicle is provided with a transmission having a chamber with fluid therein. The vehicle includes a core and a conductor that are mounted within the chamber. The core includes a pair of elements that are oriented toward each other along a longitudinal axis. Each element includes a base with a post and at least two projections extending longitudinally from the base. The conductor is disposed over the posts and is configured to receive the fluid through an opening formed between adjacent projections.

6 Claims, 6 Drawing Sheets

(51) Int. Cl.
*H01F 27/32* (2006.01)
*B60K 1/00* (2006.01)

(56) References Cited

U.S. PATENT DOCUMENTS

| | | | |
|---|---|---|---|
| 2,608,610 A * | 8/1952 | Thulin | 336/192 |
| 3,162,829 A * | 12/1964 | Snelling | H01F 17/043 |
| | | | 336/136 |
| 3,184,564 A | 5/1965 | Ryckman et al. | |
| 3,195,086 A * | 7/1965 | Taylor | 336/83 |
| 3,197,167 A * | 7/1965 | Sturgis | H01F 17/043 |
| | | | 248/314 |
| 3,227,980 A * | 1/1966 | Roser | H01F 17/043 |
| | | | 336/136 |
| 3,261,905 A * | 7/1966 | Allen | H01F 27/08 |
| | | | 165/47 |
| 3,317,849 A * | 5/1967 | Smith-Vaniz | H03F 3/602 |
| | | | 307/17 |
| 4,123,677 A * | 10/1978 | Laskaris | H02K 9/20 |
| | | | 310/52 |
| 4,150,278 A * | 4/1979 | Resener | 219/121.69 |
| 4,282,567 A * | 8/1981 | Voigt | H01F 27/255 |
| | | | 336/178 |
| 4,485,367 A | 11/1984 | Hashizume | |
| 4,549,158 A * | 10/1985 | Mitsui | H01F 5/02 |
| | | | 336/192 |
| 4,577,175 A * | 3/1986 | Burgher et al. | 336/61 |
| 4,581,477 A | 4/1986 | Harumoto et al. | |
| 5,352,853 A | 10/1994 | Takagi | |
| 6,384,703 B1 * | 5/2002 | Ramos et al. | 336/58 |
| 6,392,519 B1 | 5/2002 | Ronning | |
| 6,688,383 B1 | 2/2004 | Sommer et al. | |
| 6,772,603 B2 | 8/2004 | Hsu et al. | |
| 6,927,667 B1 * | 8/2005 | Busletta | H01F 17/045 |
| | | | 336/180 |
| 7,009,317 B2 | 3/2006 | Cronin et al. | |
| 7,205,875 B2 | 4/2007 | Oughton, Jr. et al. | |
| 7,212,406 B2 | 5/2007 | Kaishian et al. | |
| 7,508,289 B1 | 3/2009 | Wernicki | |
| 7,561,429 B2 | 7/2009 | Yahata et al. | |
| 7,823,669 B2 | 11/2010 | Bandai et al. | |
| 8,009,004 B2 | 8/2011 | Ahangar et al. | |
| 8,201,650 B2 | 6/2012 | Yoshida | |
| 8,215,003 B2 | 7/2012 | Saka et al. | |
| 2003/0098769 A1 * | 5/2003 | Cheung et al. | 336/208 |
| 2004/0032312 A1 | 2/2004 | Yu et al. | |
| 2004/0045749 A1 | 3/2004 | Jaura et al. | |
| 2004/0184292 A1 * | 9/2004 | Knox | 363/58 |
| 2006/0103256 A1 * | 5/2006 | Welke | H02K 1/20 |
| | | | 310/216.004 |
| 2007/0075812 A1 | 4/2007 | Su et al. | |
| 2009/0108971 A1 | 4/2009 | Okamoto | |
| 2010/0072865 A1 | 3/2010 | Endo et al. | |
| 2010/0175933 A1 | 7/2010 | Yoshida | |
| 2010/0245016 A1 | 9/2010 | Kameda et al. | |
| 2011/0068506 A1 | 3/2011 | Kusawake et al. | |
| 2011/0096496 A1 | 4/2011 | Doo et al. | |
| 2011/0121935 A1 | 5/2011 | Chu et al. | |
| 2011/0140820 A1 * | 6/2011 | Guentert et al. | 336/58 |
| 2011/0156853 A1 | 6/2011 | Kato et al. | |
| 2011/0241815 A1 * | 10/2011 | Lu | H01F 27/306 |
| | | | 336/198 |
| 2011/0267161 A1 | 11/2011 | MacLennan et al. | |
| 2012/0044647 A1 | 2/2012 | Lee et al. | |
| 2012/0139684 A1 | 6/2012 | Kobayashi et al. | |
| 2012/0194311 A1 | 8/2012 | Suzuki | |
| 2012/0200382 A1 | 8/2012 | Hejny | |
| 2013/0106556 A1 | 5/2013 | Suzuki et al. | |
| 2013/0141201 A1 * | 6/2013 | Chou | H01F 3/10 |
| | | | 336/55 |

FOREIGN PATENT DOCUMENTS

| | | | | |
|---|---|---|---|---|
| DE | 202005001931 U1 | 5/2005 | | |
| DE | 102010043595 A1 | 5/2012 | | |
| FR | 2622064 A | 4/1989 | | |
| FR | 2622064 A1 * | 4/1989 | | H02K 9/19 |
| GB | 740572 A | 11/1955 | | |
| JP | 55149430 A | 11/1980 | | |
| JP | 60210817 A | 10/1985 | | |
| JP | 03050807 A * | 3/1991 | | |
| JP | 05217748 A * | 8/1993 | | |
| JP | 2003007547 A * | 1/2003 | | |
| JP | 2003007547 A * | 1/2003 | | |
| JP | 2011062061 A * | 3/2011 | | |
| JP | 2011122711 A | 6/2011 | | |
| JP | 2012169466 A | 9/2012 | | |
| WO | 2011132361 A1 | 10/2011 | | |
| WO | 2012107826 A1 | 8/2012 | | |
| WO | 2012153619 A1 | 11/2012 | | |
| WO | 2013001591 | 1/2013 | | |

OTHER PUBLICATIONS

James, et al., "DC_DC Converter for Hybrid and All Electric Vehicles," EVS24 International Battery, Hybrid and Fuel Cell Electric Vehicle Symposium, Stavanger, Norway (2009) pp. 1-9.

Marz, et al. "Power Electronics System Intergration for Electric and Hybrid Vehicles," Fraunhofer Institute of Integrated Systems and Device Technology, Erlangen Germany, (2010) pp. 1-10.

Chinese Patent Office, Second Office Action for the corresponding Chinese Patent Application No. 201310552769.X, dated Sep. 30, 2017.

* cited by examiner

INDUCTOR ASSEMBLY

TECHNICAL FIELD

One or more embodiments relate to an inductor assembly of a DC-DC converter.

BACKGROUND

The term "electric vehicle" as used herein, includes vehicles having an electric machine for vehicle propulsion, such as battery electric vehicles (BEV), hybrid electric vehicles (HEV), and plug-in hybrid electric vehicles (PHEV). A BEV includes an electric machine, wherein the energy source for the electric machine is a battery that is re-chargeable from an external electric grid. In a BEV, the battery is the source of energy for vehicle propulsion. A HEV includes an internal combustion engine and one or more electric machines, wherein the energy source for the engine is fuel and the energy source for the electric machine is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

Electric vehicles may include a voltage converter (DC-DC converter) connected between the battery and the electric machine. Electric vehicles that have AC electric machines also include an inverter connected between the DC-DC converter and the electric machine. A voltage converter increases ("boosts") or decreases ("bucks") the voltage potential to facilitate torque capability optimization. The DC-DC converter includes an inductor (or reactor) assembly, switches and diodes. A typical inductor assembly includes a conductive coil that is wound around a magnetic core. The inductor assembly generates heat as current flows through the coil. An existing method for cooling the DC-DC converter by circulating fluid through a conduit that is proximate to the inductor is disclosed in U.S. 2004/0045749 to Jaura et al.

SUMMARY

In one embodiment, a vehicle is provided with a transmission having a chamber with fluid therein. The vehicle includes a core and a conductor that are mounted within the chamber. The core includes a pair of elements that are oriented toward each other along a longitudinal axis. Each element includes a base with a post and at least two projections extending longitudinally from the base. The conductor is disposed over the posts and is configured to receive the fluid through an opening formed between adjacent projections.

In another embodiment, an inductor assembly is provided with a core and a conductor. The core includes a pair of elements that are oriented toward each other along a longitudinal axis, each element having a base with a post and at least two projections extending longitudinally from the base. The projections are radially spaced apart from the post and angularly spaced apart from each other. The conductor is disposed over the posts and configured to receive fluid through an opening formed between adjacent projections.

In yet another embodiment, a voltage converter is provided with an inductor assembly mounted within a transmission and at least two switches mounted external to the transmission. The inductor assembly includes a conductor formed into a coil and a core having a pair of elements oriented toward each other along a longitudinal axis. Each element has a base with a post extending longitudinally from the base and into the coil.

As such, the inductor assembly provides advantages over existing inductor assemblies by facilitating direct cooling of the conductor and core. Further the inductor assembly provides a simplified structure without potting compound or additional housings and cold plates. Additionally, this structure simplifies the mounting and packaging of the inductor assembly inside of the transmission and minimizes Electromagnetic Interference (EMI) and the leakage inductance by substantially surrounding the conductor with the magnetic core.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
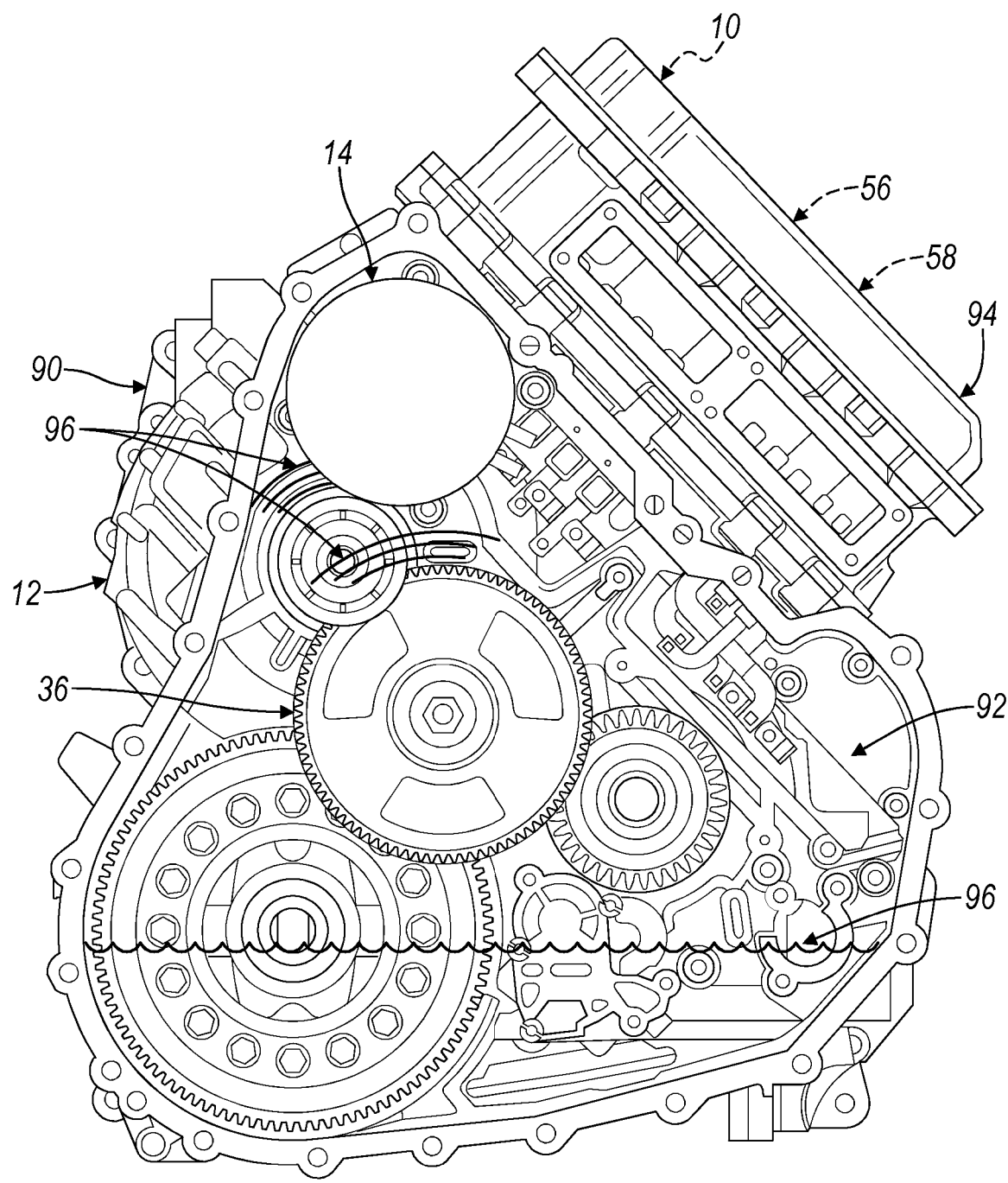
FIG. 1 is a front view of a transmission and a variable voltage converter (VVC) having an inductor assembly mounted within the transmission according to one or more embodiments.

With reference to FIG. 1, a DC-DC converter is illustrated in accordance with one or more embodiments and is generally referenced by numeral 10. The DC-DC converter 10 may also be referred to as a variable voltage converter (VVC) 10. The VVC 10 is an assembly with components that are mounted both inside and outside of a transmission 12. The VVC 10 includes an inductor assembly 14 that is mounted inside of the transmission 12 and a number of switches and diodes (shown in FIG. 3) that are mounted outside of the transmission 12. By mounting the inductor assembly 14 within the transmission 12, the assembly 14 may be directly cooled by transmission fluid which allows for a simplified design.

Figure 2:
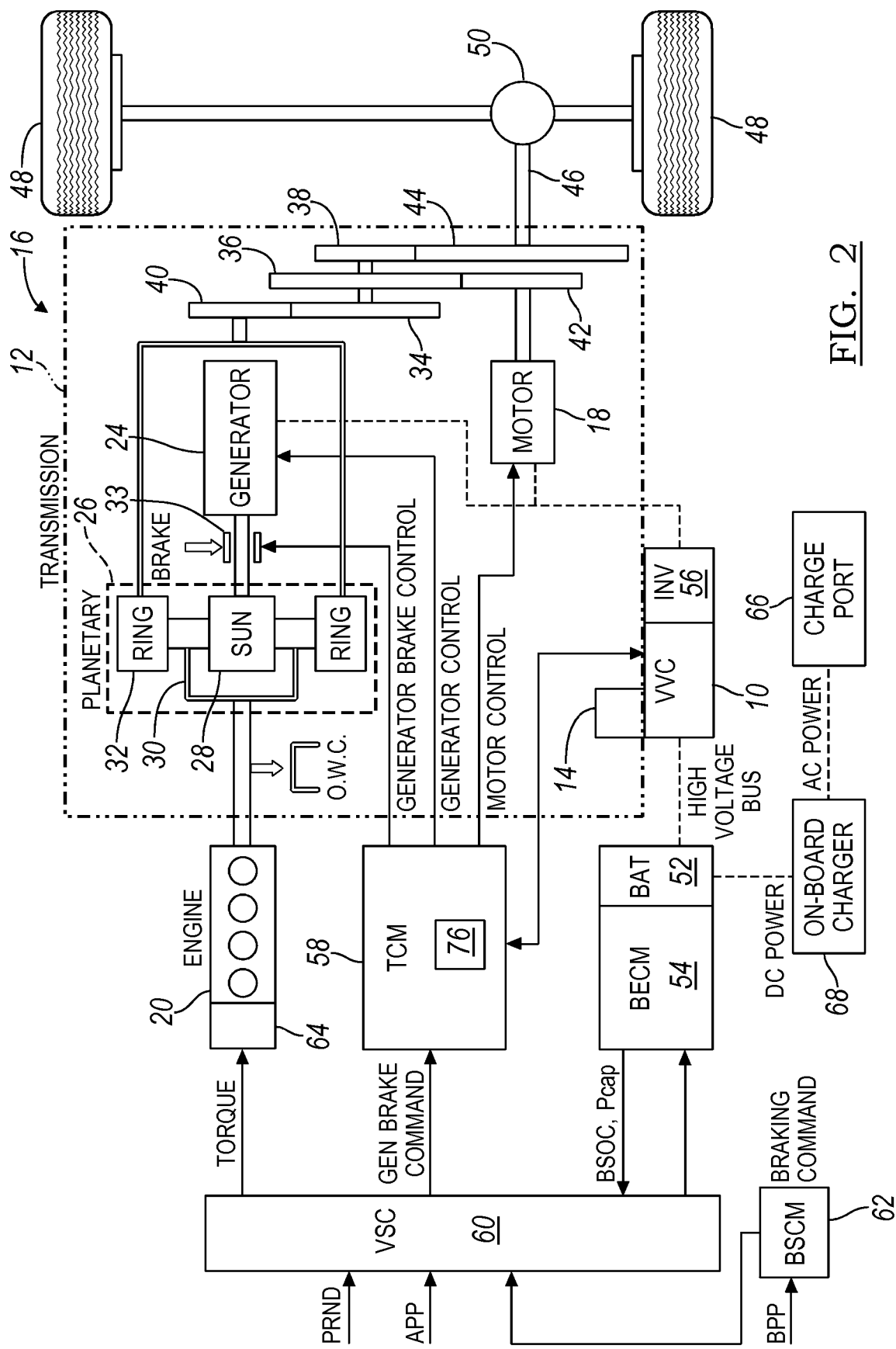
FIG. 2 is a schematic diagram of a vehicle including the transmission and the VVC of FIG. 1.

Referring to FIG. 2, the transmission 12 is depicted within a plug-in hybrid electric vehicle (PHEV) 16, which is an electric vehicle propelled by an electric machine 18 with assistance from an internal combustion engine 20 and connectable to an external power grid. The electric machine 18 is an AC electric motor according to one or more embodiments, and depicted as the "motor" 18 in FIG. 1. The electric machine 18 receives electrical power and provides drive torque for vehicle propulsion. The electric machine 18 also functions as a generator for converting mechanical power into electrical power through regenerative braking.

The transmission 12 has a power-split configuration, according to one or more embodiments. The transmission 12 includes the first electric machine 18 and a second electric machine 24. The second electric machine 24 is an AC electric motor according to one or more embodiments, and depicted as the "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 also includes a one-way clutch (O.W.C.) and a generator brake 33, according to one or more embodiments. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. In other embodiments, the O.W.C. and the generator brake 33 are eliminated, and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of the BSOC and the battery power capability to other vehicle systems and controllers.

The transmission 12 includes the VVC 10 and an inverter 56. The VVC 10 and the inverter 56 are electrically connected between the main battery 52 and the first electric machine 18; and between the battery 52 and the second electric machine 24. The VVC 10 "boosts" or increases the voltage potential of the electrical power provided by the battery 52. The VVC 10 also "bucks" or decreases the voltage potential of the electrical power provided by the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the main battery 52. Other embodiments of the transmission 12 include multiple inverters (not shown), such as one invertor associated with each electric machine 18, 24.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 provides a regenerative braking command to the VSC 60, according to one embodiment.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle 16 is configured as a plug-in hybrid electric vehicle (PHEV) according to one or more embodiments. The battery 52 periodically receives AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

Although illustrated and described in the context of a PHEV 16, it is understood that embodiments of the VVC 10 may be implemented on other types of electric vehicles, such as a HEV or a BEV.

Figure 3:
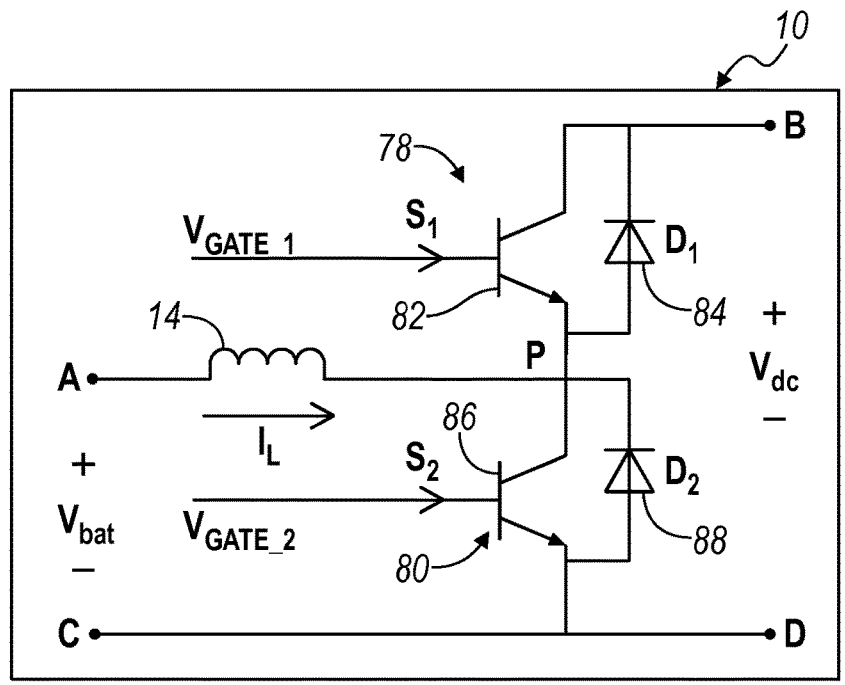
FIG. 3 is a circuit diagram of the VVC of FIG. 1.

With reference to FIG. 3, the VVC 10 includes a first switching unit 78 and a second switching unit 80 for boosting the input voltage ($V_{bat}$) to provide output voltage ($V_{dc}$). The first switching unit 78 includes a first transistor 82 connected in parallel to a first diode 84, but with their polarities switched (anti-parallel). The second switching unit 80 includes a second transistor 86 connected anti-parallel to a second diode 88. Each transistor 82, 86 may be any type of controllable switch (e.g., an insulated gate bipolar transistor (IGBT) or field-effect transistor (FET)). Additionally, each transistor 82, 86 is individually controlled by the TCM 58. The inductor assembly 14 is depicted as an input inductor that is connected in series between the main battery 52 and the switching units 78, 80. The inductor 14 generates magnetic flux when a current is supplied. When the current flowing through the inductor 14 changes, a time-varying magnetic field is created, and a voltage is induced. Other embodiments of the VVC 10 include different circuit configurations (e.g., more than two switches).

Referring back to FIG. 1, the transmission 12 includes a transmission housing 90, which is illustrated without a cover to show internal components. As described above, the engine 20, the motor 18 and the generator 24 include output gears that mesh with corresponding gears of the planetary gear unit 26. These mechanical connections occur within an internal chamber 92 of the transmission housing 90. A power electronics housing 94 is mounted to an external surface of the transmission 12. The inverter 56 and the TCM 58 may be mounted within the power electronics housing 94. The VVC 10 includes components (e.g., the switches 78, 80 and diodes 84, 88 shown in FIG. 3) that are mounted within the power electronics housing 94, and the inductor assembly 14 which is mounted within the chamber 92 of the transmission housing 90.

The transmission 12 includes fluid 96 such as oil, for lubricating and cooling the gears located within the transmission chamber 92 (e.g., the intermediate gears 34, 36, 38). The transmission chamber 92 is sealed to retain the fluid 96. The transmission 12 also includes pumps and conduits (not shown) for circulating the fluid. The transmission 12 may include nozzles (not shown) for directly spraying the fluid 96 on components within the housing 90. Additionally, rotating components (e.g., the second gear 36) may splash fluid 96 on other components. Further, the fluid 96 accumulates within a lower portion of the chamber 92. Therefore components may be mounted to a lower portion of the housing 90, such that they are immersed in the fluid 96. The inductor assembly 14 is mounted within the transmission chamber 92 such that it is directly cooled by the transmission fluid 96 through spraying, splashing and/or immersion.

Figure 4:
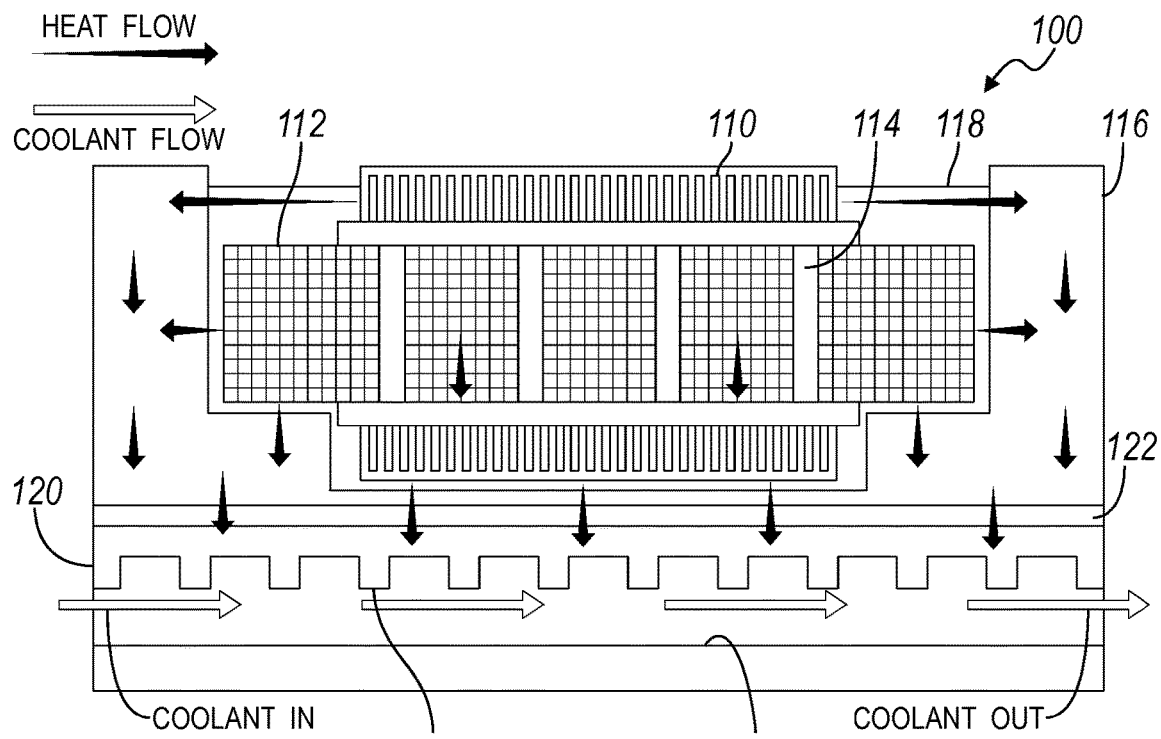
FIG. 4 is a section view of an inductor assembly according to another embodiment.

FIG. 4 illustrates an inductor assembly 100 that is configured for indirect cooling according to an existing method. Such an inductor assembly 100 is mounted external of the transmission housing 90 (e.g., within the power electronics housing 94 of FIG. 1). The inductor assembly 100 includes a conductor 110 that is wrapped around a magnetic core 112. The magnetic core 112 includes a plurality of core elements that are spaced apart to define air gaps 114. Ceramic spacers may be placed between the core elements to maintain the air gaps 114. The inductor assembly 100 is encased inside an inductor housing 116 (e.g., an Aluminum housing) and empty space around the inductor assembly 100 is filled with a thermally conductive, electrically insulating potting compound 118. The inductor housing 116 is clamped to a cold plate 120 and thermal grease 122 is applied between the inductor housing 116 and the cold plate 120. A passage 124 is formed through the cold plate 120. Cold fluid or coolant (e.g., 50% water and 50% ethylene glycol) flows through the passage 124. Heat transfers by conduction from the conductor 110 and the core 112 to the potting compound 118 and then to housing 116, thermal grease 122 and finally into the cold plate 120. Heat from the cold plate 120 transfers into the coolant flowing through the passage 124 by convection. Additionally the cold plate 120 may include fins 126 for transferring heat into surrounding air by convection.

The thermal resistance of the heat transfer path from the conductor 110 to the coolant flowing through the passage 124 of the cold plate 120 is high. The thermal grease 122, the potting compound 118 and the cold plate 120 contribute significantly to this resistance. As a result, the thermal performance of this potted inductor assembly 100 is limited and the temperature of the inductor assembly 100 at various locations increases and may exceed predetermined temperature limits at high electrical power loads. In one or more embodiments, a controller (e.g., the TCM of FIG. 1) may limit the performance of the inductor assembly 100 if temperatures of the inductor assembly 100 exceed such predetermined limits.

The temperature of the inductor assembly 100 depends on the amount of current flowing through the conductor 110 and the voltage potential across the conductor 110. Recent trends in electric vehicles include higher current capability of the inductor. For example, increased battery power for the extended electric range in PHEVs and reduced battery cells for the same power in HEVs result in increased inductor current rating in electric vehicles. Additionally, reduced battery voltage also leads to an increase in the inductor ac losses due to a higher magnitude of high frequency ripple current. Therefore, due to additional heat generation, the temperature of the inductor assembly 100 will generally increase and if heat is not dissipated, the inductor temperature may exceed predetermined limits. One solution is to increase the cross-sectional area of the conductor coil to reduce inductor loss and also improve heat dissipation (due to more surface area). However, such changes will increase the overall size of the inductor assembly. A larger inductor assembly may be difficult to package in all vehicle applications, and larger components affect vehicle fuel economy and cost.

Rather than increase the size of the inductor assembly 100, to improve the inductor thermal performance and thermal capacity, the inductor assembly 100 may be mounted within the transmission chamber 92 and directly cooled using transmission fluid 96 as described with reference to FIG. 1. The transmission fluid 96 is an electrical insulator which can be used in direct contact with electrical components (e.g., the conductor 110 and the core 112). However, excess components associated with the inductor assembly 100 may be removed if the assembly 100 is subjected to such direct cooling. For example, the potting compound 118 and the aluminum housing 116 may be removed. However, the potting compound 118 and the housing 116 support the conductor 110 and the core 112. Additionally, vibration is more severe inside of the transmission 12, than outside. Therefore the overall structure of the inductor assembly 100 is revised in order to remove the potting compound 118 and housing 116 and mount the assembly inside of the transmission 12.

Figure 5:
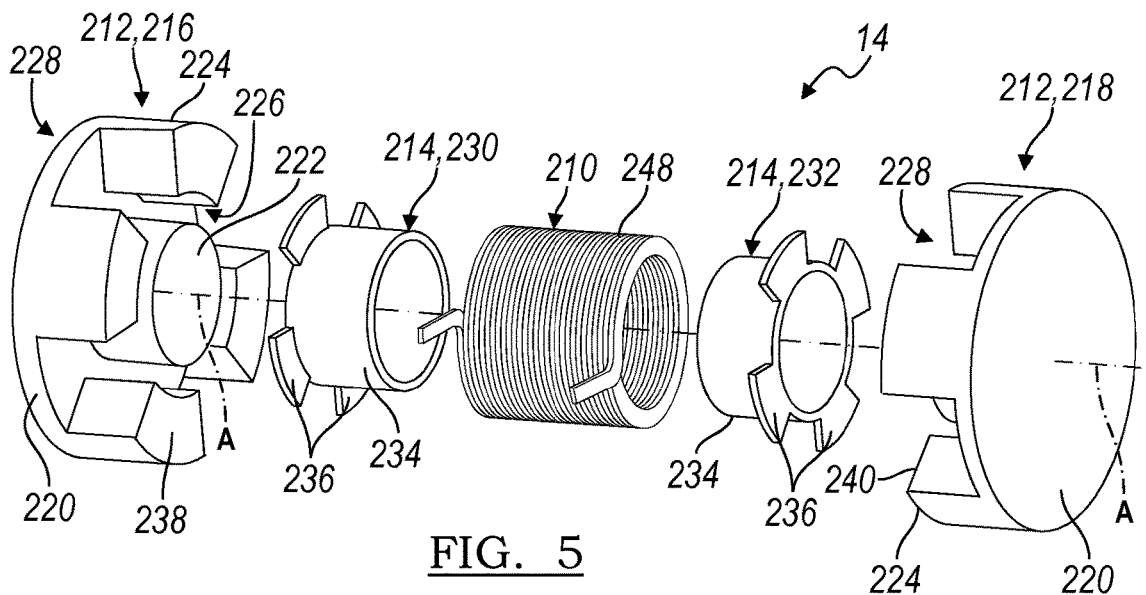
FIG. 5 is an exploded side perspective view of the inductor assembly of FIG. 1.

FIG. 5 illustrates an inductor assembly 14 that is configured to be mounted within the transmission and directly cooled by transmission fluid. The inductor assembly 14 includes a conductor 210, a core 212 and an insulator 214.

The conductor 210 is formed of a conductive material, such as copper, and wound into a helical coil having a cylindrical shape. The coil is formed using a rectangular (or flat) type conductive wire by an edgewise process, according to one or more embodiments. An input and output lead extend from the coil.

The core 212 is formed of a magnetic material, such as an iron silicon alloy powder. The core 212 includes a first core element 216 and a second core element 218 that are oriented toward each other along a longitudinal axis ("A-A"). The core elements 216, 218 are identical according to one embodiment. Each core element 216, 218 includes a base 220 with a post 222 that extends longitudinally from the base 220. The post 222 has a cylindrical shape and is centered about the longitudinal axis A-A, according to the illustrated embodiment.

Each core element 216, 218 also includes an array of projections 224 that extend longitudinally from an outer periphery of the base 220. The projections 224 are radially spaced apart from the post 222 to form an inner cavity 226 around the post 222 for receiving the conductor 210. The projections 224 are also angularly spaced apart from each other to form an opening 228 between adjacent projections 224. In the illustrated embodiment, each core element 216, 218 includes four projections 224 that are equally spaced about the base 220 to form four openings 228.

Figure 7:
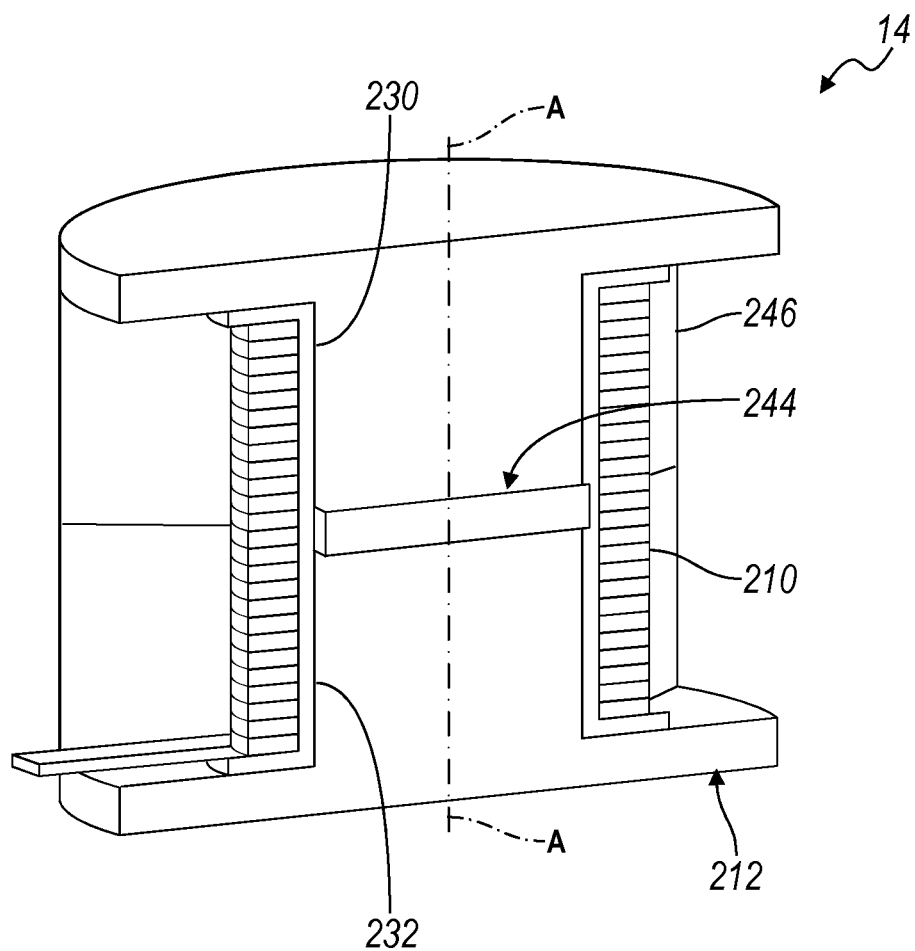
FIG. 7 is a section view of the inductor assembly of FIG. 6 taken along section line 7-7.

The insulator 214 is formed of an electrically insulating polymeric material, such as polyphenylene sulfide (PPS). The insulator 214 includes a first bobbin 230 and a second bobbin 232 that are oriented toward each other along the longitudinal axis A-A. Each bobbin 230, 232 includes a tube 234 with a series of flanges 236 extending radially from one end of the tube 234. As shown in FIG. 7, the conductor 210 is wound around the bobbins 230, 232, and the bobbins 230, 232 physically separate the conductor 210 from the core 212 and provide electrical insulation. Other embodiments of the inductor assembly 14 contemplate an insulator formed of paper (e.g., Nomex® Paper), or a coating applied to the conductor (not shown).

Figure 6:
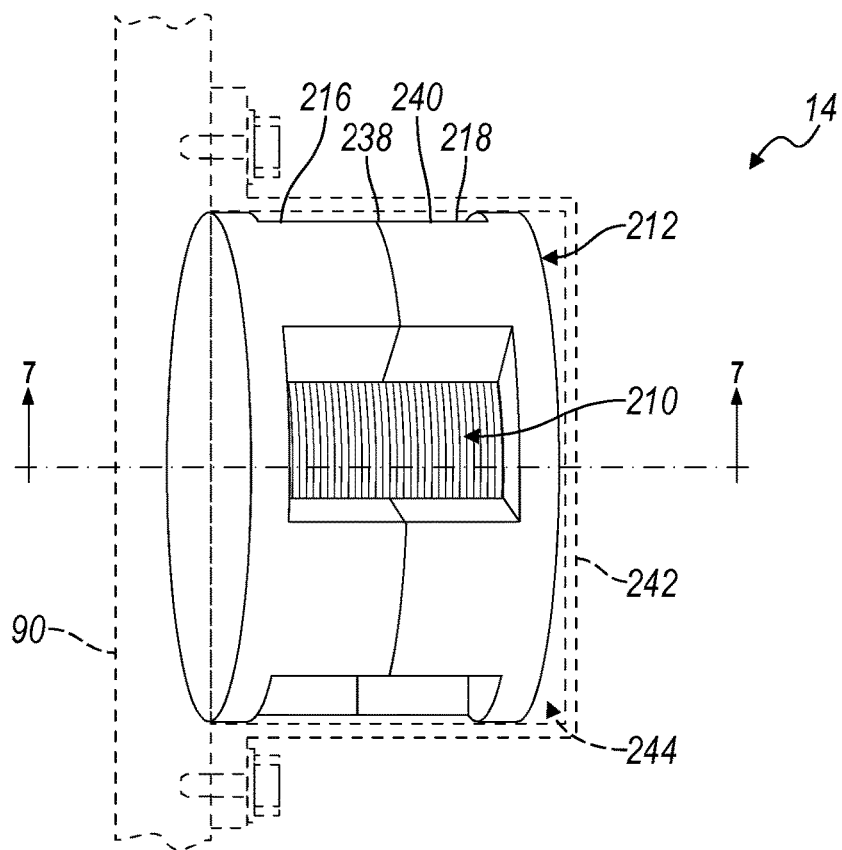
FIG. 6 is a side perspective view of the inductor assembly of FIG. 1.

Referring to FIGS. 5 and 6, the conductor 210 is externally accessible through the openings 228 formed in the core 212. Each projection 224 is oriented axially adjacent to the longitudinal axis A-A. A distal end 238 of each projection 224 of the first core element 216 contacts a distal end 240 of a corresponding projection 224 of the second core element 218 such that the inductor assembly is formed in a generally cylindrical shape, as shown in FIG. 6. The openings 228 formed in each core element 216, 218 align with the openings 228 formed in the other core element to form large openings which span a substantial portion of a height of the conductor coil. The openings 228 collectively expose an outer surface area of the conductor 210. The inductor assembly 14 receives transmission fluid through the openings 228 for cooling the conductor 210. The thermal performance of the inductor assembly 14 improves with larger openings 228 since more surface area of the conductor 210 is exposed. Other embodiments of the inductor assembly 14 contemplate core elements having two projections, more than four projections, and irregularly spaced and shaped projections to provide openings of various sizes and shapes (not shown).

The inductor assembly 14 is mounted to the transmission housing 90 using a bracket 242, according to one or more embodiments. The bracket 242 may wrap around a portion of the inductor assembly 14, without covering the openings 228. Additionally the bracket 242 may be sized to apply a preload to the inductor assembly 14 in an axial direction for maintaining a connection between the two core elements 216, 218. For example, the bracket 242 includes a recess having a longitudinal dimension that is less than a height of the inductor assembly 14, such that the bracket 242 elastically deforms when the bracket 242 is mounted to the transmission housing 90. In other embodiments, the core 212 includes an axially extending aperture (not shown) formed through the post 222 of each core element 216, 218 for receiving a bolt for mounting the inductor assembly 14 to the transmission housing 90.

FIG. 7 illustrates a cross-section view of the inductor assembly 14 taken along section line 7-7 of FIG. 6. The post 222 of each core element 216, 218 has a height that is less than a height of the adjacent projections 224. This difference results in the two posts 222 being longitudinally spaced apart from each other along the longitudinal axis A-A to define an air gap 244. In one or more embodiments, the inductor assembly 14 includes a spacer 246 that is disposed in the air gap 244. The spacer 246 is formed of a ceramic material according to one embodiment. Although the illustrated embodiment depicts an air gap 244 having a predetermined longitudinal height, other embodiments of the inductor assembly 14 contemplate an adjustable air gap 244. An adjustable air gap 244 may be formed by increasing the overall longitudinal distance between the posts 222, and using a plurality of spacers (not shown) formed of both ceramic and magnetic materials that are stacked between the two posts 222. Such an adjustable air gap 244 would allow for adjusting the electrical performance (inductance profile for DC current) of the inductor assembly 14.

Referring to FIGS. 5-7, a method for assembling the inductor assembly 14 is illustrated in accordance with one or more embodiments. The pair of core elements 216, 218 are formed (e.g., by molding or casting). The bobbins 230, 232 are also formed (e.g., by molding). The conductor 210 is formed of a flat type conductive wire, and then wound into a coil 248 having a generally cylindrical shape. The coil 248 is then placed on the bobbins 230, 232. In one or more embodiments, the coil 248 is coated with an insulating material (e.g., varnish) to secure the coil 248 to the bobbins 230, 232. The posts 222 of each core element 216, 218 are inserted into an opposite end of the coil 248 until distal ends 238, 240 of each projection 224 contact corresponding distal ends of corresponding projections 224. An adhesive (not shown) may be applied to the distal ends 238, 240 to maintain the connection. The inductor assembly 14 is then mounted to the transmission housing 90 using an external bracket 242.

Figure 8:
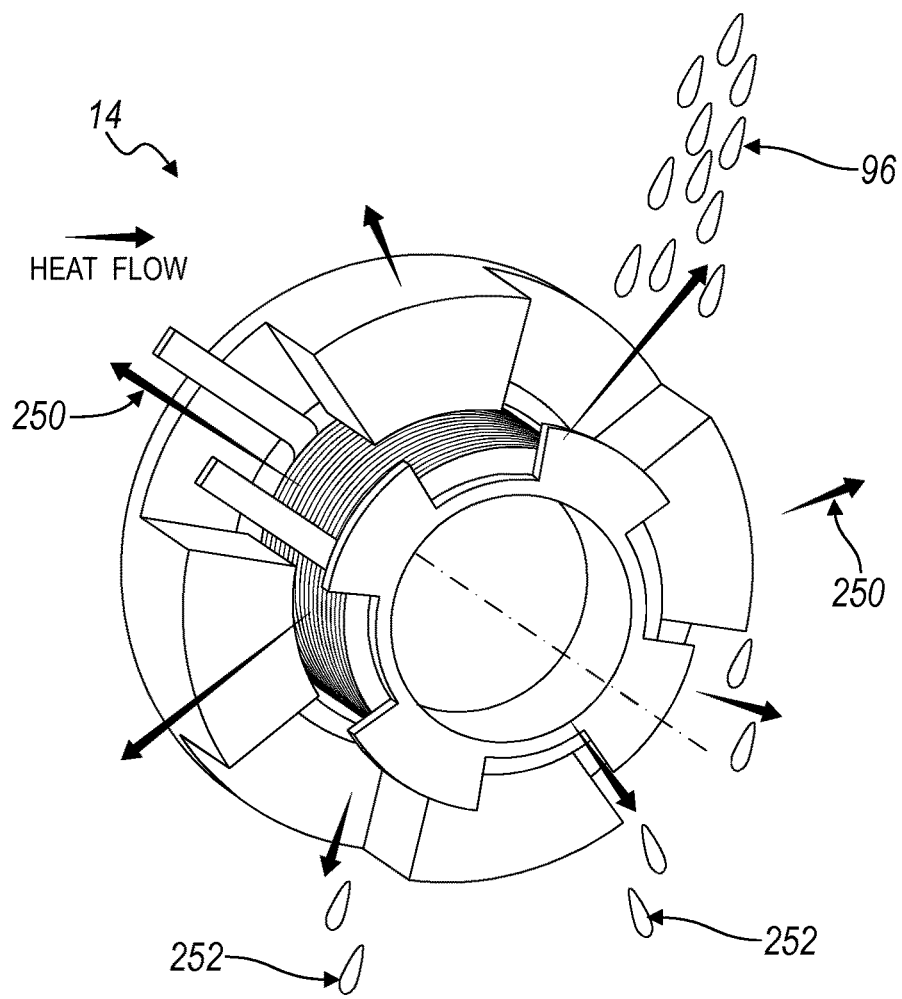
FIG. 8 is a front perspective view of the inductor assembly of FIG. 1, illustrated without a core element.
Figure 9:
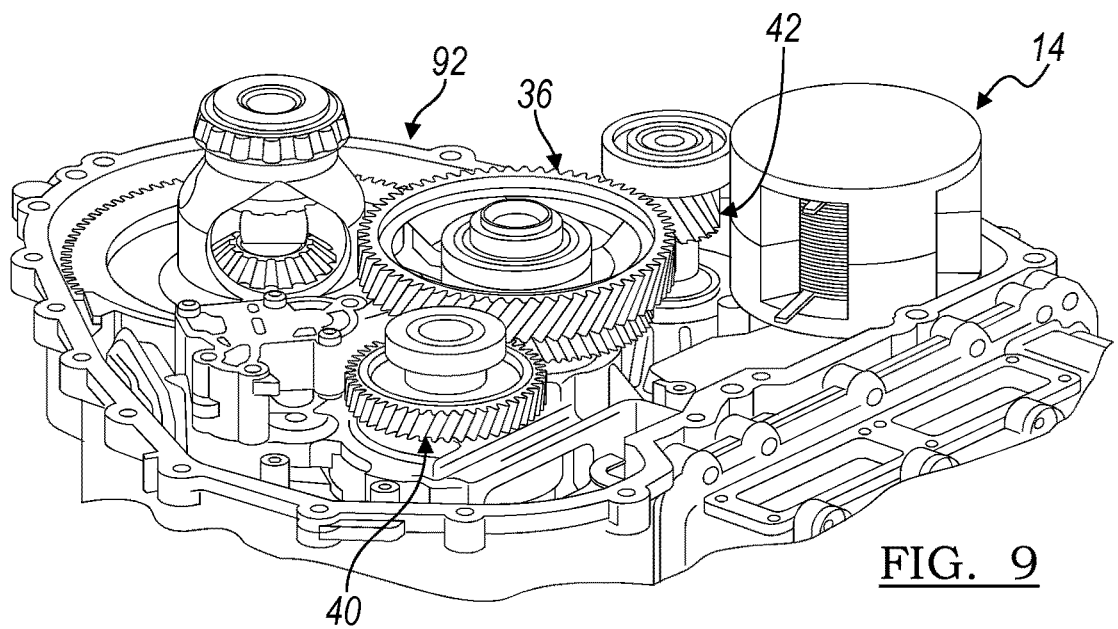
FIG. 9 is a top perspective view of the transmission of FIG. 1.

Referring to FIGS. 8 and 9 the inductor assembly 14 is configured for direct cooling by transmission fluid 96. The inductor assembly 14 produces a significant power loss at variant converter power levels. The conductor 210 may be formed of a conductive material such as copper or aluminum. When current having a high frequency component or "ripple" flows through the coil, a significant copper loss and associated magnetic flux ripple is generated which results in power loss. Power loss may be dissipated as heat. The inductor assembly 14 is cooled using the transmission fluid 96 to facilitate the dissipation or transfer of heat.

The inductor assembly 14 is mounted within the transmission chamber 92 such that it is directly cooled by the transmission fluid 96 that sprays off of gears (e.g., the second intermediate gear 36 shown in FIG. 1) according to the illustrated embodiment. The inductor assembly 14 generates heat as current flows through the conductor 210. Heat flows radially away from the inductor assembly 14, as represented by numeral 250 in FIG. 8. The transmission fluid 96 enters the inductor assembly 14 through one or more of the openings 228. Heat transfers by convection from the conductor 210 and core 212 to the fluid 96, as the fluid 96 flows over the inductor assembly 14. The heated fluid 252 then exits the inductor assembly 14 through one or more of the openings 228.

As such the inductor assembly 14 provides advantages over existing inductor assemblies by facilitating direct cooling of the conductor 210 and core 212. Further the inductor assembly 14 provides a simplified structure without potting compound or additional housings and cold plates that add inefficiencies to heat dissipation. Additionally, this structure simplifies the mounting and packaging of the inductor assembly 14 inside of the transmission and minimizes Electromagnetic Interference (EMI) and the leakage inductance by substantially surrounding the conductor 210 with the magnetic core 212.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductor assembly comprising:
 a flat conductor;
 a core having a pair of axially oriented elements, the elements including a post defining an axial aperture therethrough and more than two projections extending axially from a base, the projections being radially spaced from the post and angularly spaced apart to define openings between the projections and configured to receive and direct a splashed fluid toward the conductor disposed in a single layer over the post;
 a pair of insulated bobbins, disposed between the conductor and the posts, each having radial flanges at an end configured to be received in the openings; and
 a bolt extending through the aperture and fastened to a transmission.

2. The inductor assembly of claim 1 wherein the projections are annular sector shaped.

3. The inductor assembly of claim 2 wherein the flanges are annular sector shaped.

4. The inductor assembly of claim 1 wherein the projections are angularly spaced apart irregularly such that the openings are of different dimensions.

5. The inductor assembly of claim 1 wherein an axial length of each post is less than an axial length of the projections such that a gap is defined between the posts.

6. The inductor assembly of claim 1 wherein the projections are angularly spaced apart equally such that the openings are of approximately equal dimensions.

* * * * *